3,320,182
HIGH ACTIVITY NICKEL-ALUMINA
CATALYST
William F. Taylor, Scotch Plains, and John H. Sinfelt, Berkeley Heights, N.J., assignors to Esso Research and Engineering Company, a corporation of Delaware
No Drawing. Filed Oct. 21, 1963, Ser. No. 317,799
4 Claims. (Cl. 252—466)

This invention relates to a nickel catalyst of high activity and activity maintenance, particularly in the production of a fuel gas having a high methane content by reaction of normally liquid hydrocarbons containing principally paraffins of 5 to 8 carbon atoms per molecule with steam at relatively low average reaction temperatures in the range of 600° to 925° F., preferably with feed inlet temperatures of 600° to 850° F. in an adiabatic reactor.

Nickel catalysts are made in accordance with the present invention by coprecipitating nickel and aluminum as hydroxides, carbonates, or basic carbonates, with a precipitating agent such as ammonium bicarbonate to obtain a precipitate of high nickel content relative to aluminum content, e.g. 0.4 to 1.3 gm. atoms Ni/1 gm. atom Al, and free from substances which are not to remain in the finished catalyst when the precipitate is dried, then calcined in air at proper temperatures. The activity and activity maintenance of this kind of catalyst are enhanced by certain metals, namely barium, strontium, cesium, and potassium added to the wet precipitate in small amounts prior to the drying and calcination, as oxides or compounds decomposable to oxides in the calcination. The promoter metal is admixed in a proportion of 0.001 up to 1.0 promoter metal atoms per Ni atom. The resulting calcined product is activated finally by a treatment with hydrogen which reduces nickel oxide in the calcined product. The thus obtained nickel catalysts are distinguishable from the best known nickel-alumina catalysts in their method of preparation, also in various characteristics such as their high nickel-content, high surface area, ease of reduction, high activity and good activity maintenance.

Nickel catalysts in which a solid refractory support or carrier such as magnesia, kaolin or china clay (alumina silicates), or alumina is impregnated with a nickel compound, with or without alkali metal and alkaline earth metal oxides as promoters, are known to have been used for reacting $C_1$ to $C_4$ paraffins with steam at temperatures above 1000° F. to form mainly hydrogen and oxides of carbon. This high-temperature reaction is endothermic and the catalyst is exposed to high temperatures. The promoters are indicated to reduce carbon deposition. The same kinds of nickel catalysts prepared by impregnation and without controlled calcination have been described to be used in steam reforming of higher hydrocarbons to produce methane at temperatures up to 1022° F., and no tests were reported to show whether they are able to maintain a high activity for a sufficiently long period to make their use practical.

In accordance with the discoveries of the present invention, high nickel-content, high surface-area nickel-$Al_2O_3$ catalysts prepared by a coprecipitation technique using $NH_4HCO_3$ and with essentially controlled temperatures of drying and calcining have been found to be conveniently reducible, to be more active, and to have lower deactivation rates in extensive life tests of reacting steam with $C_5$ to $C_8$ paraffins to produce methane than other kinds of nickel catalysts, including commercial types, and the types described in the literature.

The superior high nickel-containing, high surface-area nickel-$Al_2O_3$ catalyst even without a promoter has been found significantly more active and more stable than other types of catalysts containing a potassium promoter, and they can be made still more effective when prepared in the proper manner with certain promoters or activators, particularly barium, strontium, cesium, or potassium, each of which has a different order of effectiveness.

Coprecipitation technique studies have shown that preparation variables, particularly the temperatures, are important in determining performance of the catalyst. It is important to avoid exposure of the catalyst to high temperatures which tend to cause deterioration as indicated by lowered surface area. It is also important to prevent contamination of the catalyst by substances which tend to deactivate the catalyst, such as sulfur-containing compounds, halogens, and other contaminants.

The preferred procedure for making the coprecipitated nickel-alumina catalyst in a manner that gives a reproducibly superior catalyst is to prepare an aqueous solution of nickel nitrate and aluminum nitrate in desired proportions using preferably deionized water to avoid undesired contaminating salts. Ammonium bicarbonate is added to the solution of the salts as a precipitating agent gradually with stirring of the solution and maintaining the solution at a proper temperature within the range of about 32° to 212° F., preferably between 90° to 212° F. The nickel-aluminum basic carbonate precipitate is separated from the excess solution and dried at a suitable temperature, preferably in the range of about 200° to 400° F. After the drying, which is normally done for approximately 18 hours, the dried precipitate is calcined in the presence of oxygen-containing gas or air, at a suitable calcination temperature in the range within critical limits of 600° to 915° F. Catalyst granules of a suitable size can be separated from the calcined material by screening, or the catalyst can be formed by various means to any desired shape.

During the calcination, the nickel and aluminum are in an oxidized form and for final activation the catalyst is subjected to treatment with hydrogen at a temperature in the range of about 600° to 925° F. The reduction treatment can be carried out after the catalyst is loaded into a reactor.

In the low-temperature reaction of steam with vapors of low-boiling normally liquid hydrocarbons containing principally $C_5$ to $C_8$ paraffins using a nickel catalyst of high activity to produce gas containing mainly methane, the hydrocarbon vapor and the steam are preheated to a temperature in the range of 600° to 850° F. to maintain a low average reaction temperature, preferably in the range of 650° to 900° F. in the reaction zone, this average being the arithmetical means between the temperatures at the inlet and outlet of the reaction zone. Generally, the proportion of steam is about 1.5 to 5 parts by weight for one part by weight of hydrocarbon, preferably 1.8 to 2.5 parts water per part of hydrocarbon.

The pressure in the reaction zone may be in the range of 1 to 70 atmospheres, preferably greater than 10 atmospheres since it has been found that higher pressures reduce carbon formation to a point where there is little carbon formed over long periods of time.

By having the reaction temperature sufficiently low and the pressure sufficiently high, the content of methane in the gas produced is increased. The desired fuel gas product should generally contain greater than 50% by volume of methane on a dry basis and the concentration of methane can be increased by removal of carbon dioxide and water vapor. A methane gas-rich fuel gas product obtained through the reaction of the low boiling paraffinic hydrocarbons with steam may be used for diluting other fuel gases such as natural gas or gas containing carbon monoxide and hydrogen. The gas product may be used as a town gas or fuel gas per se because it has a sufficiently high calorific content.

In the low temperature catalytic conversion reaction of the paraffinic hydrocarbons with steam the net heat of reaction is generally exothermic so that there is no need to supply heat to the reactor other than the sensible heat of the reactant hydrocarbons and steam which may be preheated to a temperature below the average reaction temperature to be maintained without other heat from an external source.

Details on the preferred methods for preparing the catalyst, using the catalyst, and testing the catalyst are given in the following examples.

*Example 1.—Unpromoted nickel-$Al_2O_3$ catalyst of high activity*

To prepare an unpromoted nickel-$Al_2O_3$ catalyst using the coprecipitation technique, 740 g. $Al(NO_3)_3 \cdot 9H_2O$ and 750 g. $Ni(NO_3)_2 \cdot 6H_2O$ were dissolved in 3 liters of deionized water. With the solution temperature at approximately 50° F., 1040 g. of $NH_4HCO_3$ were added at a controlled rate while heating sufficiently so that the temperature during coprecipitation did not fall below 32° F. The slurry was stirred continuously during the coprecipitation. After the precipitation was finished, the slurry was stirred for an additional 30 minutes, then the precipitate was separated from the excess solution by filtering with a Buchner funnel, without washing. The resulting precipitate was dried overnight in an oven at 350° F., and then calcined in air for 4 hours at 750° F.

The resulting unpromoted catalyst thus formed has a Ni content of 47.1 wt. percent. It has a high B.E.T. total surface area of 170 m.$^2$/g. catalyst, and a nickel surface area as measured by $H_2$ chemisorption of 20 m.$^2$/g. catalyst.

The catalyst so prepared was charged to a reactor, reduced with $H_2$ for 10 hours at the relatively low temperature of 700° F. and its activity measured by passing 95% n-hexane over it at 10.6 w./hr./w., at 700° F. (temperature of lead bath into which the reactor was immersed) and 500 p.s.i.g. with 2.0 lbs. of $H_2O$ per lb. of hydrocarbon. At hour 38 to 54 on feed, the catalyst converted 20.6 percent of the feed producing a dry gas of the following composition.

Gas composition, mole percent (dry, all $C_2+$ material removed):
  $CH_4$ _____ 47.05
  $H_2$ _____ 30.56
  CO _____ 0.63
  $CO_2$ _____ 21.75

The heating value of this gas on a dry basis with all but 2% $CO_2$ removed is 721 B.t.u./s.c.f.

Since the reaction is exothermic, the temperature differential from the inlet to outlet in a fixed bed of fresh highly active catalyst may be as much as 100° F. or more. An effort was made to keep the reactor close to isothermal conditions for test purposes by having the steel reaction tube or reactor immersed in a molten lead bath of a controlled temperature, such as the temperature at the geometric center of the catalyst bed in the reactor.

A series of catalysts having a nominal composition of 45 to 50 wt. percent nickel were prepared by the coprecipitation technique with no added promotor. However, coprecipitation, drying, and calcination temperatures were varied to see how these variables affected total and nickel surface areas, initial activity, and activity maintenance of the catalyst in a reaction of hexane with steam at 700° F. The nickel surface area was determined for each of the catalysts by hydrogen chemisorption measurements after reduction in $H_2$ at 700° F. The nickel surface area measurements showed the catalyst had a nickel surface area in the range of 9 to 30 square meters per gram.

The activity of each catalyst was measured in a standard test by the reaction of hexane with steam using 1 lb. of hexane per 2 lbs. of $H_2O$ at a rate of 5.6 lbs. of hexane per lb. of catalyst per hour in a reactor immersed in a molten lead bath held at a temperature of 700° F. and under a pressure of 500 p.s.i.g. The catalysts were prereduced for 10 hours with $H_2$ at the relatively low temperature of 700° F. to insure that a good catalyst would also be easy to reduce.

Tests were carried out for a period of 50 to 100 hours and the activity was determined by the extent of hexane conversion and the heating value of the gas. In general, the activity at approximately 50 hours on feed was used as a measure of both initial activity and activity maintenance of the catalyst.

*Example 2.—Unpromoted $Ni-Al_2O_3$ catalyst*

A catalyst was prepared as in Example 1, except the coprecipitation was carried out at 120° F., the slurry was stirred for an additional 2 hours at 120° F., and the precipitate was dried at 230° F. overnight. Then, the dried material was calcined in air in an oven for 4 hours at 750° F. The catalyst analyzed 47.7 wt. percent Ni, had a total area of 184 m.$^2$/g. by B.E.T. In the standard test the catalyst converted 58.6 percent of the feed at hours 32 to 40 on feed, producing a dry gas of the following composition:

Gas composition, mole percent (dry, all $C_2+$ material removed):
  $CH_4$ _____ 56.27
  $H_2$ _____ 21.73
  CO _____ 0.02
  $CO_2$ _____ 21.98

The heating value of this gas on a dry basis with all but 2% of $CO_2$ removed is 802 B.t.u./s.c.f.

*Example 3.—Unpromoted $Ni-Al_2O_3$ catalyst*

A catalyst was prepared as in Example 2, except the precipitated material was dried overnight at 350° F. The dried precipitate was then calcined in air in an oven for 4 hours at 750° F. The catalyst analyzed 49.4 wt. percent nickel, had a total surface area by B.E.T. of 207 m.$^2$/g. catalyst and a nickel surface area of 23 m.$^2$/g. catalyst as measured by $H_2$ chemisorption after $H_2$ reduction at 700° F. In the standard test the catalyst converted 78.8% of the feed during hours 40 to 50 on feed and produced a dry gas of the following composition:

Gas composition, mole percent (dry, all $C_2+$ material removed):
  $CH_4$ _____ 68.73
  $H_2$ _____ 11.38
  CO _____ 0.49
  $CO_2$ _____ 19.39

The heating value of this gas on a dry basis with all but 2% of $CO_2$ removed is 891 B.t.u./s.c.f.

*Example 4.—Unpromoted $Ni-Al_2O_3$ catalyst*

A catalyst was prepared as in Example 2, except the catalyst was calcined for 4 hours in air in an oven at 1020° F. The catalyst analyzed 48.4 wt. percent nickel and had a total surface area as measured by B.E.T. of 143 m.$^2$/g. catalyst. In the standard test the catalyst converted 15.3% of the feed during hours 16 to 20 on feed, producing a dry gas of the following composition:

Gas composition, mole percent (dry, all $C_2+$ material removed):
  $CH_4$ _____ 40.66
  $H_2$ _____ 37.38
  CO _____ 0.08
  $CO_2$ _____ 21.88

The heating value of the gas on a dry basis with all but 2% of $CO_2$ removed is 667 B.t.u./s.c.f.

*Example 5.—Unpromoted $Ni-Al_2O_3$ catalyst*

A catalyst was prepared as in Example 2, except the coprecipitation was at 212° to 190° F., and the slurry heated an additional 2 hours at 212° F. The precipitated material was dried overnight at 230° F. and was then calcined at 750° F. for 4 hours in air in an oven. The catalyst analyzed 48.7 wt. percent nickel, had a total surface area by B.E.T. of 195 m.²/g. catalyst and a nickel surface area of 29 m.²/g. catalyst after $H_2$ reduction at 700° F. In the standard test the catalyst converted 67.8% of the feed during hours 42 to 50 on feed and produced a dry gas of the following composition:

Gas composition, mole percent (dry, all $C_2+$ material removed):
    $CH_4$ ———————————————————— 63.91
    $H_2$ ————————————————————— 14.18
    CO —————————————————————— 0.52
    $CO_2$ ———————————————————— 21.39

The heating value of this gas on a dry basis with all but 2% of $CO_2$ removed is 864 B.t.u./s.c.f.

*Example 6.—Unpromoted* $Ni-Al_2O_3$ *catalyst*

A catalyst was prepared as in Example 2, except the precipitate was dried overnight at 350° F., and then calcined in air in an oven for 4 hours at 750° F. The catalyst analyzed 49.4 wt. percent nickel, has a total surface area by B.E.T. of 190 m.²/g. catalyst and a nickel surface area by $H_2$ chemisorption of 24 m.²/g. catalyst after $H_2$ reduction at 700° F. In the standard test, the catalyst converted 46.9% of the feed during hours 56 to 60 on feed producing a dry gas of the following composition:

Gas composition, mole percent (dry, all $C_2+$ material removed):
    $CH_4$ ———————————————————— 51.68
    $H_2$ ————————————————————— 25.57
    CO —————————————————————— 0.47
    $CO_2$ ———————————————————— 22.27

The heating value of this gas on a dry basis with all but 2% of $CO_2$ removed is 764 B.t.u./s.c.f.

*Example 7.—Unpromoted* $Ni-Al_2O_3$ *catalyst*

A catalyst was prepared as in Example 6, except the dried precipitate was calcined at 1020° F. for 4 hours in air in an oven. The catalyst analyzed 49.4 wt. percent nickel, and has a total surface area by B.E.T. of 149 m.²/g. catalyst, and a nickel surface area of 9 m.²/g. catalyst as measured by $H_2$ chemisorption after reduction with $H_2$ at 700° F. In the standard test the catalyst converted 31.7% of the feed during hours 46 to 50 on feed producing a dry gas of the following composition:

Gas composition, mole percent (dry, all $C_2+$ material removed):
    $CH_4$ ———————————————————— 45.60
    $H_2$ ————————————————————— 30.68
    CO —————————————————————— 0.66
    $CO_2$ ———————————————————— 23.05

The heating value of this gas on a dry basis with all but 2% of $CO_2$ removed is 715 B.t.u./s.c.f.

An examination of the Examples 1 to 7 shows that a careful control of the preparation variables is necessary for best results. All precipitates calcined at temperatures above 925° F., as in Example 7, were lower in activity and total and nickel surface areas. Thus, the precipitates should be calcined preferably at 600° to 925° F.

The precipitate drying temperature is preferably related to the coprecipitation temperature for best performance. If the coprecipitation is at 90° to 150° F., the precipitate should be dried between 300° to 400° F., preferably at 340° to 360° F. If the coprecipitation is at 150° to 212° F., the precipitate should be dried at 200° to 300° F., preferably at 220 to 240° F. If the precipitate is obtained at below 90° F., it should be dried at above 350° F., but below the calcination temperature of 600° F. Overall preferred conditions include coprecipitation at between 90° to 212° F., drying at between 200° to 400° F., and calcining in air at between 600° and 925° F.

The tests shown in the Examples 1 to 7 demonstrated that the nickel-alumina catalyst made with the techniques described is superior even without a promoter to commercial nickel catalysts described in the literature and which contained promoters.

Using the coprecipitation, drying, and calcining techniques described, various alkali and alkali earth metal compounds were added to the precipitates at the 3 wt. percent level to determine the effects of the added metals on the activity of the catalyst. The alkali metals Na and K were added as hydroxides and the other metals were added as nitrates. From these tests it was determined that the initial activity of the catalyst is increased and activity maintenance improved mainly by the metals Ba, Sr, Cs, and K, and is decreased by sodium. Calcium seemed to have no net effect on the catalyst, but could possibly be a promoter at higher concentrations. In general, the higher the atomic number of the metal used as the activator or promoter for a given concentration, the greater is the effectiveness of the metal for increasing the activity of the catalyst. Representative comparison of results is illustrated in the following table:

TABLE I.—COMPARISON OF PROMOTERS FOR HIGH ACTIVITY $Ni-Al_2O_3$ CATALYSTS

| Promoter at 3 Wt. Percent Level | Atomic Number | Activity at Hour 50 s.c.f./hr. Product Gas [1] | Percent Increase Relative to Unpromoted Catalyst |
|---|---|---|---|
| Na | 11 | 3.0 | −50 |
| K | 19 | 9.4 | +55 |
| Cs | 55 | 10.5 | +72 |
| Ca | 20 | 6.0 | 0 |
| Sr | 38 | 8.0 | +34 |
| Ba | 56 | 10.2 | +70 |

[1] Standard Test: 5.6 w./hr./w. of hexane, 700° F., 500 p.s.i.g., 2# $H_2O$/# HC. Catalyst prereduced with $H_2$ for 10 hours at 700° F.

Emphasis is placed on the barium and strontium promoters because they can be used to make a relatively low cost catalyst with outstanding activity maintenance in addition to good initial activity. Cesium makes the catalyst active but increases the cost of the catalyst. Potassium makes an inexpensive catalyst with good initial activity but the activity maintenance is poorer than that of a barium or strontium promoted catalyst.

Surface area measurements on a series of promoted catalysts prepared with the same technique as the unpromoted catalyst show that although the promoter increases the activity of the catalyst it decreases the catalyst total surface area. However, the promoters cesium, barium and strontium do not decrease the total surface area as much as does potassium.

TABLE II

| Promoter at Nominal 3 wt. Percent Level | Total Surface Area, m.²/g., Catalyst by B.E.T. | |
|---|---|---|
| | Promoted | Unpromoted |
| K | [1] 110 | [1] 190 |
| Cs | [1] 181 | [1] 190 |
| Sr | [2] 153 | [2] 184 |
| Ba | [2] 140 | [2] 184 |

[1] Ni-Al cations coprecipitated at 190° to 212° F., dried at 350° F., calcined at 750° F.
[2] Ni-Al cations coprecipitated at 120° F., dried at 230° F., calcined at 750° F.

This effect is unexpected since normally one would expect the catalyst with the highest surface area to be the most active. Studies using the $H_2$ chemisorption technique of the nickel surface area of promoted and unpromoted catalyst showed that the promoter did not increase the nickel surface area and did not improve the resistance to sintering of the nickel surface area.

TABLE III
[Nickel Surface Area m.²/g. Catalyst]

| Overnight treatment with H₂ at given temp., °F. | Promoted with [1] 3 wt. percent barium | Unpromoted [1] |
| --- | --- | --- |
| 700 | 22 | 25 |
| 1,100 | 22 | 24 |
| 1,300 | 20 | 23 |

[1] Both catalysts prepared by coprecipitating Ni-Al cations at 120° F., drying at 220° F., and calcination at 750° F. Promoted catalyst analyzed 47.6 wt. percent nickel; unpromoted catalyst analyzed 47.7 wt. percent nickel.

The nickel surface area of both the unpromoted and promoted catalysts, however, showed excellent resistance to sintering. Thus, the promoter effect on the catalyst is entirely unexpected since the promoter causes (1) lower total surface area, (2) does not increase nickel surface area, and (3) does not improve the resistance to sintering of the nickel surface area. This would suggest that the promoter affects the Town Gas reaction directly in some way. As a direct check of this, a catalyst prepared with twice as much barium as had been previously employed (i.e. approximately 6 wt. percent rather than 3 wt. percent barium) showed a greatly improved activity as measured in the standard activity test. Extended runs with the various catalysts lasting up to 1200 hours also showed that the barium promoted catalyst resisted loss of catalyst activity much better than did a potassium promoted catalyst. Analysis of catalysts dumped after standard pilot plant tests showed that the potassium promoter was extensively stripped from the catalyst but that all the barium promoter essentially remained on the catalyst.

TABLE IV
[Promoter Wt. Percent by Wet Chemical Analyses]

| | As Charged | After 100 hours on Feed [1] |
| --- | --- | --- |
| K | 2.7 | 1.3 |
| Ba | 2.9 | 2.8 |

[1] 5.6 w./hr./w. of hexane, 2# H₂O/#HC, 700° F. and 500 p.s.i.g.

Thus, in terms of activity maintenance the alkaline earth promoters such as barium and strontium are preferred to the alkali promoters such as potassium and cesium.

Tests with promoted catalysts also show that promoted catalysts prepared in the preferred coprecipitation and drying temperature range disclosed for unpromoted catalysts are superior to catalysts prepared outside this range. Thus, the preferred preparation conditions specified for unpromoted catalysts also apply to a promoted catalyst.

The following examples illustrate in more detail how the promoters can be incorporated under proper conditions to make a conveniently reducible catalyst of high initial activity, and having good activity maintenance.

*Example 8.*—*Potassium promoted* $Ni-Al_2O_3$ *catalyst of high activity*

To 3 liters of deionized water was added 740 g. of $Al(NO_3)_3 \cdot 9H_2O$ and 750 g. of $Ni(NO_3)_2 \cdot 6H_2O$, after which the solution was heated to boiling (212° F.) and stirred. To this solution was added 1040 g. of $NH_4HCO_3$ while adding heat to maintain the solution at a boil. Temperature was maintained between 190° and 212° F. After the precipitation was completed the precipitate in solution was boiled for an additional 2 hours, and then allowed to cool and sit overnight at room temperature. The precipitate was filtered and the resultant filter cake divided into 2 equal parts by weight. To one half of the precipitate was added 6.5 g. of solid KOH dissolved in a little distilled water and mixed well. No promoter was added to the other half of the batch. The resultant wet solid materials were dried overnight at 350° F., and then calcined in an oven in air at 750° F. for 4 hours. The promoted catalysts analyzed 46.5 wt. percent nickel and 2.7 wt. percent K and had a total surface area of 110 m.²/g. catalyst. The unpromoted catalyst analyzed 49.4 wt. percent nickel and had a total surface area of 190 m.²/g.

The catalysts were reduced with H₂ for 10 hours at 700° F. and then subjected to the standard catalyst tests using 5.6 w./hr./w. of 95% normal hexane, 700° F. reaction temperature, 500 p.s.i.g. pressure, 2 lbs. of steam per lb. of hydrocarbon.

During hours 60 to 68 on feed the promoted catalyst converted 76.1% of the feed producing a gas of the following composition:

Gas composition, mole percent (dry, all $C_2+$ material removed):

$CH_4$ _____ 64.96
$H_2$ _____ 13.26
$CO$ _____ 0.45
$CO_2$ _____ 21.33

The heating value of this gas on a dry basis with all but 2% of the $CO_2$ removed is 873 B.t.u./s.c.f. By comparison the unpromoted catalyst during hours 50 to 56 on feed converted only 46.9% of the feed and produced a gas (on a dry basis with all but 2% of $CO_2$ removed) with a heating value of 764 B.t.u./s.c.f.

*Example 9.*—*Cesium promoted* $Ni-Al_2O_3$ *catalyst*

The cesium promoted catalyst was prepared as follows: 750 g. of $Ni(NO_3)_2 \cdot 6H_2O$ and 740 g. of $Al(NO_3)_3 \cdot 9H_2O$ were added to 3.0 liters of deionized water, stirred and the solution brought to a boil. Then 1040 g. of $NH_4HCO_3$ was added while maintaining the slurry at a boil. After the coprecipitation was finished the slurry was stirred and boiled an additional 2 hours. The slurry was then filtered but not washed. To the resultant precipitate was added 13.4 g. of cesium nitrate. The resultant wet solid material was dried overnight at 350° F., and then calcined in air for 4 hours at 750° F. The catalyst analyzed 48.6 wt. percent nickel and 3.1 wt. percent cesium and had a total surface area of 181 m.²/g. catalyst.

In the standard test the Cs catalyst converted 98.8% of the feed during hours 48 to 56 on feed, producing a dry gas of the following composition:

Gas composition, mole percent (dry, all $C_2+$ material removed):

$CH_4$ _____ 71.09
$H_2$ _____ 7.48
$CO$ _____ 0.48
$CO_2$ _____ 20.95

The heating value of this gas on a dry basis with all but 2% of $CO_2$ removed is 922 B.t.u./s.c.f. An examination of Examples 1 to 7 shows that this Cs promoted catalyst is superior to the unpromoted catalysts.

*Example 10.*—*Barium promoted* $Ni-Al_2O_3$ *catalyst*

A barium promoted catalyst was made by dissolving 750 g. of $Ni(NO_3)_2 \cdot 6H_2O$ and 740 g. of $Al(NO_3)_3 \cdot 9H_2O$ in 3.0 liters of deionized water. Coprecipitation is carried out by adding 1040 g. of $NH_4HCO_3$ while keeping slurry temperature at approximately 32° F. At the end of the addition, the slurry was stirred an additional 10 minutes and then filtered. To the precipitate 17.2 g. of $Ba(NO_3)_2$ was added and mixed well. The mixture was dried at 350° F. for at least 10 hours and then calcined in air for 4 hours at 750° F. This catalyst analyzed 45.6 wt. percent nickel and 3.2 wt. percent barium and had a total surface area of 145 m.²/g. catalyst. In the standard test the catalyst converted 73.1% of the feed during hours 56 to 64 and produced a gas of the following composition:

Gas composition, mole percent (dry, all $C_2+$ material removed):

$CH_4$ _____ 62.20
$H_2$ _____ 15.57
$CO$ _____ 0.53
$CO_2$ _____ 21.70

The heating value of this gas on a dry basis with all but 2% of $CO_2$ removed is 802 B.t.u./s.c.f. An unpromoted catalyst prepared at the same coprecipitation, drying and calcination temperature (Example 1) is inferior to the barium promoted catalyst.

*Example 11.—Barium promoted Ni-$Al_2O_3$ catalyst*

A barium promoted catalyst was made by dissolving 750 g. of $Ni(NO_3)_2 \cdot 6H_2O$ and 740 g. of $Al(NO_3)_3 \cdot 9H_2O$ in 3.0 liters of deionized water. Coprecipitation was carried out by adding 1040 g. of $NH_4HCO_3$ while keeping the slurry at 120° F. At the end of the addition, the slurry was stirred an additional 2 hours at 120° F., and then filtered to remove approximately 300 cc. of water from the slurry. To the precipitate paste 17.2 g. of $Ba(NO_3)_2$ dissolved in a little deionized water was added and mixed well. The mixture was dried overnight at 220° F. and then calcined in air for 4 hours at 750° F. The catalyst analyzed 47.6 wt. percent nickel and 2.9 wt. percent barium and had a total surface area of 140 m.²/g. catalyst.

In the standard test the catalyst showed the following conversions and gas compositions:

TABLE V

| Hours | 56 to 64 | 128 to 136 | 374 to 380 |
|---|---|---|---|
| Percent Feed Conversion | 92.4 | 69.0 | 45.9 |
| Gas Composition, Mole percent (dry, all $C_2$+ material removed): | | | |
| $CH_4$ | 70.30 | 61.65 | 52.42 |
| $H_2$ | 8.45 | 16.84 | 25.27 |
| CO | 0.06 | 0.08 | 0.01 |
| $CO_2$ | 21.19 | 21.43 | 22.30 |
| Heating Value B.t.u./s.c.f. (dry, but 2% $CO_2$ removed) | 917 | 845 | 771 |

This data shows that promoted catalysts prepared at the preferred coprecipitation and drying temperatures are superior to promoted catalysts not prepared under these conditions (see Example 10). This barium catalyst is also superior to any unpromoted catalyst prepared, and exhibits outstanding activity maintenance, superior in this respect to a potassium or cesium promoted catalyst.

*Example 12*

A barium promoted catalyst containing 3 wt. percent Ba prepared according to this invention was tested for methanation and water gas shift reaction of carbon monoxide as follows: the catalyst was reduced with $H_2$ for 10 hours at 750° F., then 63 w./hr./w. of carbon monoxide was passed over the catalyst at atmospheric pressure along with $H_2$ at a mole ratio of $H_2$ to CO of 3. At 650° F. the catalyst converted 86.7% of the carbon monoxide producing a dry product gas of the following composition (on $H_2$ free basis) 69.1 mole percent $CH_4$, 17.6 mole percent $CO_2$ and 13.3 mole percent CO.

The foregoing example demonstrates that the catalyst promotes the exothermic methanation reaction of CO with $H_2$ to form $CH_4$ and promotes the exothermic water gas shift reaction of CO with $H_2O$ to form $CO_2$ and $H_2$, also.

*Example 13.—Strontium promoted Ni-$Al_2O_3$ catalyst*

A strontium promoted catalyst was made by dissolving 750 g. of $Ni(NO_3)_2 \cdot 6H_2O$ and 740 g. of $Al(NO_3)_3 \cdot 9H_2O$ in 3 liters of deionized water. Coprecipitation was carried out by adding 1040 g. of $NH_4HCO_3$ while keeping the slurry temperature at 120° F. At the end of the addition the slurry was stirred an additional 2 hours while holding the temperature at 120° F. The slurry was partially filtered and then 22.0 g. of $Sr(NO_3)_2$ dissolved in a little water added to the wet precipitate and stirred well. The mixture was dried overnight at 230° F. and then calcined for 4 hours in air at 750° F. The catalyst analyzed 43.9 wt. percent nickel and 2.8 wt. percent strontium and had a total surface area of 153 m.²/g. catalyst.

In the standard test the catalyst converted 72.8% of the feed during hours 40 to 46 on feed, and produced a dry gas of the following composition:

Gas composition, mole percent (dry, all $C_2$+ material removed):
$CH_4$ _____ 61.34
$H_2$ _____ 16.77
CO _____ 00.23
$CO_2$ _____ 21.66

The heating value of this gas on a dry basis with all but 2% of $CO_2$ removed is 844 B.t.u./s.c.f. This strontium promoted catalyst is superior to an unpromoted catalyst coprecipitated, dried and calcined at the same temperature (Example 2) which only converted 58.6% of the feed at hours 32 to 40 on feed.

The highly active catalysts formed by coprecipitation of nickel and aluminum cations combined as hydroxides, carbonates, or basic carbonates of ammonium followed by drying and calcining at proper temperatures, produces an interspersion of nickel oxide and aluminum oxide in a combined structure of these oxides which cannot be obtained by an impregnation technique, or by a precipitation which requires removal of undesired ions from a precipitate by intensive washing, or by a method which does not have the drying and calcining at proper temperatures for avoiding disruption of the catalyst structure.

In general, the improved Ni-$Al_2O_3$ catalysts of high activity have a total surface area of about 100 to 200 sq. meters and a nickel surface area in the range of 20 to 30 sq. meters per gram of catalyst. These catalysts, in general, contain 40 to 60 wt. percent Ni with 60 to 40 wt. percent $Al_2O_3$ on a dry basis with respect to these two components and may contain varying amounts of promoter depending on the promoter chosen. When the potassium promoter is used, very small amounts are suitable, e.g. 0.1 wt. percent to 2 wt. percent; however, this promoter and the others may be used in higher proportions. When barium is used, promoting action is increased with the proportion of barium, e.g. 6 wt. percent Ba is better than 3 wt. percent.

A simplified process flow may be used to produce the methane-rich gas. A light naphtha of principally $C_5$ to $C_8$ paraffins is pumped to the reaction pressure, e.g. 500 p.s.i.g., and heated to 700° F. by indirect heat exchange with reactor effluent gas product leaving the reactor at a higher temperature, e.g. 830° F., since the reaction is slightly exothermic. The preheated light naphtha is mixed with steam of similar temperature and pressure on being passed into the reactor containing the catalyst activated by $H_2$ therein. The sulfur level of the feed is preferably below 3 p.p.m. by weight. Water condensate is removed from the cooled gas product and $CO_2$ may then be removed by solid adsorbents, e.g. lime or by liquid absorbents. Condensable hydrocarbons may be condensed out.

A desired feature of the process is the production of constant gas quality at a fixed feed rate during the run. At reaction temperatures of 650° to 850° F. a gas product rich in methane and having a calorific value of greater than 800 B.t.u./s.c.f. may be obtained at high feed conversion levels. The heating value of the gas may be raised to 900 to 1000 B.t.u./s.c.f. by removing all the $CO_2$ in a suitable manner. Such a gas product can be obtained during the entire course of a run at a fixed feed rate by progressively raising the inlet temperature to the catalyst bed as the catalyst loses activity to maintain a high conversion level. For example, the inlet temperature could initially be set at 650° to 670° F. and then raised slowly as the catalyst deactivates to a higher value. Operation at a sufficiently high pressure allows the catalyst to run in such a manner at an average temperature range of 650° to 925° F. without excessive carbon formation using steam to hydrocarbon ratios as low as 2#$H_2O$/#HC for prolonged periods of time.

A high activity Ni-Al$_2$O$_3$ catalyst prepared as in Example 8 but with lower K content analyzed as containing 45.7 wt. percent nickel and 1.8 wt. percent potassium with a total surface area of 151 m.$^2$/g. catalyst, ran for 1278 hours at 700° F., and 500 p.s.i.g. and 2 pounds H$_2$O per pound of hydrocarbon with both a 95% n-hexane feed and a C$_5$/C$_6$ paraffinic naphtha feed with the following carbon analyses:

TABLE VI

Wt. percent carbon on catalyst:
  Fresh catalyst _____ 0.19
  After 1278 hours on feed _____ 0.36

A lower B.t.u. content gas can be obtained at lower conversion levels but this tends to lower the efficiency of the process and to require extensive recycle of unconverted feed.

In comparative runs a nominal 95% n-hexane feed was used (an analysis indicated 96.5% n-hexane, 2.5% methyl cyclopentane and 1% methylpentane) but it has been confirmed that typical naphtha feeds are suitable for obtaining the desired products also. A catalyst analyzing 45.7 wt. percent nickel and 1.8 wt. percent potassium and having a total surface area of 151 m.$^2$/g. was run at 500 p.s.i.g., 700° F. (temperature of the molten lead bath in which the reactor and pre-heat coil was immersed) and 2 lbs. of water per lb. of hydrocarbon. The catalyst was run at a fixed temperature using the 95% n-hexane feed for 1278 hours. At hour 1048 a C$_5$/C$_6$ paraffinic naphtha was introduced with the following composition until hours 1146 when the 95% n-hexane feed was introduced again.

TABLE VII

Compounds in wt. percent in C$_5$/C$_6$ paraffinic naphtha:
  C$_4$ _____ 0.5
  C$_5$'s+cyclopentane _____ 72.6
  C$_6$ paraffins _____ 21.0
  C$_6$ naphthenes _____ 3.6
  Benzene _____ 1.0
  C$_7$+ _____ 1.3
                                                                                        100.0

The space velocity during this period was held constant at 1.1 w./hr./w. (lbs. hydrocarbon per hour per lb. of catalyst).

Examination of the quantity of the gas produced and its composition indicate that a naphtha feed can be used as well as a 95% n-hexane feed.

TABLE VIII

|  | Hours | | |
| --- | --- | --- | --- |
|  | 1,043 | 1,090 | 1,162 |
| Feed | n-Hexane | C$_5$/C$_6$ Naphtha | n-Hexane |
| Gas Make, s.c.f./hr | 3.0 | 2.9 | 3.0 |
| Gas Composition, Mole percent (dry basis, all C$_2$+ material removed): | | | |
|   CH$_4$ | 61.8 | 59.3 | 61.9 |
|   H$_2$ | 16.6 | 19.3 | 16.3 |
|   CO | Trace | Trace | Trace |
|   CO$_2$ | 21.6 | 21.4 | 21.8 |

The invention described is claimed as follows:

1. A catalyst of high activity and activity maintenance for producing methane by reaction of C$_5$ to C$_8$ paraffins with steam and reaction of CO with H$_2$ at 600° to 925° F., when the catalyst is activated by treatment with H$_2$ at 600° to 925° F., consisting essentially of an interspersion of nickel oxide and aluminum oxide in dried and calcined coprecipitated nickel and aluminum compounds of the class consisting of hydroxides, carbonates, and basic carbonates, containing 40 to 60 wt. percent Ni and 60 to 40 wt. percent Al$_2$O$_3$ on a dry basis, having a total surface area of about 100 to 200 square meters per gram of catalyst and having 20 to 30 square meters of nickel surface area per gram of catalyst when activated.

2. A catalyst as defined in claim 1 containing an oxide of a promoter metal of the class consisting of barium, strontium, cesium, and potassium in a promoting amount of 0.001 to 1.0 promoter metal atoms per nickel atom.

3. A catalyst of high activity and activity maintenance when its nickel component is reduced to give the catalyst a nickel surface area of 20 to 30 m.$^2$/g. of catalyst for reacting C$_5$ to C$_8$ paraffins with steam at 600° to 925° F. to produce a gas rich in methane, said catalyst consisting essentially of 0.4 to 1.3 atoms of nickel per atom of aluminum from coprecipitated nickel and aluminum compounds of the group consisting of hydroxides, carbonates, and basic carbonates, dried at 200° to 400° F., and calcined in air at 600° to 925° F. to form interspersed oxides of the nickel and the aluminum.

4. A catalyst as defined in claim 2, in which a promoting metal of the group consisting of barium, strontium, cesium, and potassium is present in a proportion of 0.001 to 1.0 of the promoting metal atoms per nickel atom from a compound of the promoting metal admixed with the coprecipitated nickel and aluminum compounds before they are dried and calcined to interspersed oxides, said promoting metal compound forming an oxide under the calcining conditions.

References Cited by the Examiner

UNITED STATES PATENTS

| 2,151,329 | 3/1939 | Page et al. | 252—466 |
| 2,449,295 | 9/1948 | Gutzeit | 252—266 |
| 2,830,880 | 4/1958 | Shapleigh | 48—214 X |
| 2,868,632 | 1/1959 | Milbourne | 48—214 |
| 3,119,667 | 1/1964 | McMahon | 48—214 X |
| 3,133,029 | 5/1965 | Hoekstra | 252—466 |
| 3,186,957 | 6/1965 | Stiles | 252—466 |
| 3,201,214 | 8/1965 | Fox et al. | 48—214 |

FOREIGN PATENTS

| 820,257 | 9/1959 | Great Britain. |
| 969,637 | 9/1964 | Great Britain. |

OSCAR R. VERTIZ, *Primary Examiner.*

MILTON WEISSMAN, G. T. OZAKI,
                                            *Assistant Examiners.*